(12) United States Patent
Azizi et al.

(10) Patent No.: US 9,231,809 B2
(45) Date of Patent: Jan. 5, 2016

(54) METHODS AND ARRANGEMENTS FOR PHASE TRACKING IN WIRELESS NETWORKS

(71) Applicants: Shahrnaz Azizi, Cupertino, CA (US); Eldad Perahia, Portland, OR (US); Thomas J. Kenney, Portland, OR (US)

(72) Inventors: Shahrnaz Azizi, Cupertino, CA (US); Eldad Perahia, Portland, OR (US); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,941

(22) Filed: Dec. 29, 2012

(65) Prior Publication Data
US 2014/0050259 A1 Feb. 20, 2014

Related U.S. Application Data

(60) Provisional application No. 61/684,616, filed on Aug. 17, 2012.

(51) Int. Cl.
| | |
|---|---|
| H04L 27/26 | (2006.01) |
| H04L 5/00 | (2006.01) |
| H04L 25/03 | (2006.01) |
| H04L 25/02 | (2006.01) |

(52) U.S. Cl.
CPC .......... H04L 27/2647 (2013.01); H04L 5/0048 (2013.01); H04L 25/03159 (2013.01); H04L 27/2657 (2013.01); H04L 27/2675 (2013.01); H04L 25/0204 (2013.01); H04L 25/0224 (2013.01); H04L 2025/03414 (2013.01)

(58) Field of Classification Search
CPC ............ H04L 27/2675; H04L 27/2657; H04L 27/2647; H04L 25/03159; H04L 25/0204; H04L 2025/03414; H04L 25/0224; H04L 5/0048

See application file for complete search history.

(56) References Cited

U.S. PATENT DOCUMENTS

| | | | | |
|---|---|---|---|---|
| 7,068,593 | B2* | 6/2006 | Cho et al. ....................... | 370/208 |
| 8,179,986 | B2* | 5/2012 | Kimura et al. ................. | 375/260 |
| 8,848,841 | B2* | 9/2014 | Azizi et al. .................... | 375/340 |
| 2004/0160346 | A1* | 8/2004 | Husted et al. .................. | 341/61 |
| 2004/0190637 | A1* | 9/2004 | Maltsev et al. ............... | 375/260 |
| 2006/0159188 | A1* | 7/2006 | Izumi ............................. | 375/260 |
| 2007/0268982 | A1* | 11/2007 | Inanoglu ........................ | 375/267 |

(Continued)

FOREIGN PATENT DOCUMENTS

WO 2014/028134 A1 2/2014

OTHER PUBLICATIONS

International Preliminary Report on Patentability and Written Opinion received for PCT Patent Application No. PCT/US2013/048819, mailed on Feb. 26, 2015, 6 pages.

(Continued)

*Primary Examiner* — Kenneth Lam
(74) *Attorney, Agent, or Firm* — Schubert Law Group PLLC

(57) ABSTRACT

Logic may determine phase correction information from pilot tones. Logic may determine phase correction information from some of the pilot locations. Logic may process the shifting pilot tones for less than all of the pilot tones. Logic may process pilot tones at any location within orthogonal frequency division multiplexing (OFDM) packet. Logic may determine to process only pilot tones at the even or odd symbol indices or subcarriers. And logic may transmit a packet with a frame with a capabilities information field comprising an indication that a receiver may can process shifting pilot tones for phase tracking.

30 Claims, 6 Drawing Sheets

(56) References Cited

U.S. PATENT DOCUMENTS

| | | |
|---|---|---|
| 2008/0056305 A1 | 3/2008 | Medvedev et al. |
| 2008/0219340 A1 | 9/2008 | Saed |
| 2009/0060075 A1* | 3/2009 | Mohebbi ................. 375/260 |
| 2011/0037653 A1 | 2/2011 | Tominaga |
| 2011/0274442 A1 | 11/2011 | Zhang et al. |
| 2012/0051476 A1* | 3/2012 | Shi et al. ................ 375/359 |
| 2012/0195391 A1* | 8/2012 | Zhang et al. ............ 375/295 |
| 2012/0300874 A1* | 11/2012 | Zhang ..................... 375/295 |
| 2013/0070713 A1* | 3/2013 | Stadelmeier et al. ...... 370/329 |
| 2013/0177115 A1* | 7/2013 | Yang et al. .............. 375/347 |
| 2013/0223359 A1* | 8/2013 | Kenney et al. ........... 370/329 |
| 2013/0266086 A1* | 10/2013 | Yang et al. .............. 375/295 |

OTHER PUBLICATIONS

International Search Report and Written Opinion received for PCT Patent Application No. PCT/US2013/048819, mailed on Oct. 18, 2013, 10 pages.

* cited by examiner

| SYMBOL NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| PILOT | -8 | -9 | -10 | -11 | -12 | -13 | -1 | -2 | -3 | -4 | -5 | -6 | -7 |
| TONES | 6 | 5 | 4 | 3 | 2 | 1 | 13 | 12 | 11 | 10 | 9 | 8 | 7 |

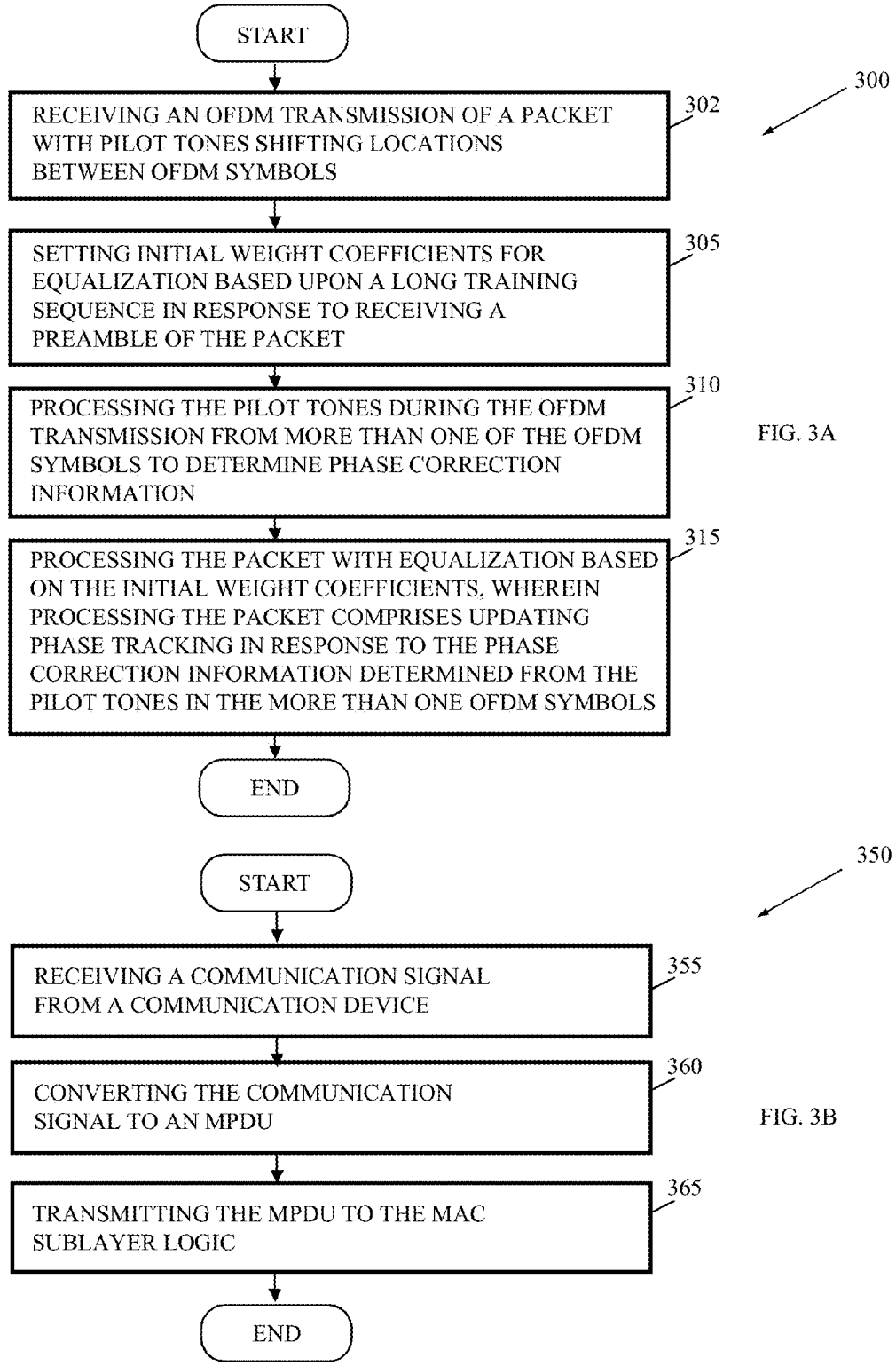

METHODS AND ARRANGEMENTS FOR PHASE TRACKING IN WIRELESS NETWORKS

BACKGROUND

Embodiments are in the field of wireless communications. More particularly, the present disclosure relates to phase tracking based upon shifting pilot tones.

BRIEF DESCRIPTION OF THE DRAWINGS

FIGS. 3A-B depict embodiments of flowcharts to process pilot tones to track the phase of the channel and to generate, transmit, receive, parse, and interpret communications.

DETAILED DESCRIPTION OF EMBODIMENTS

Figure 1:
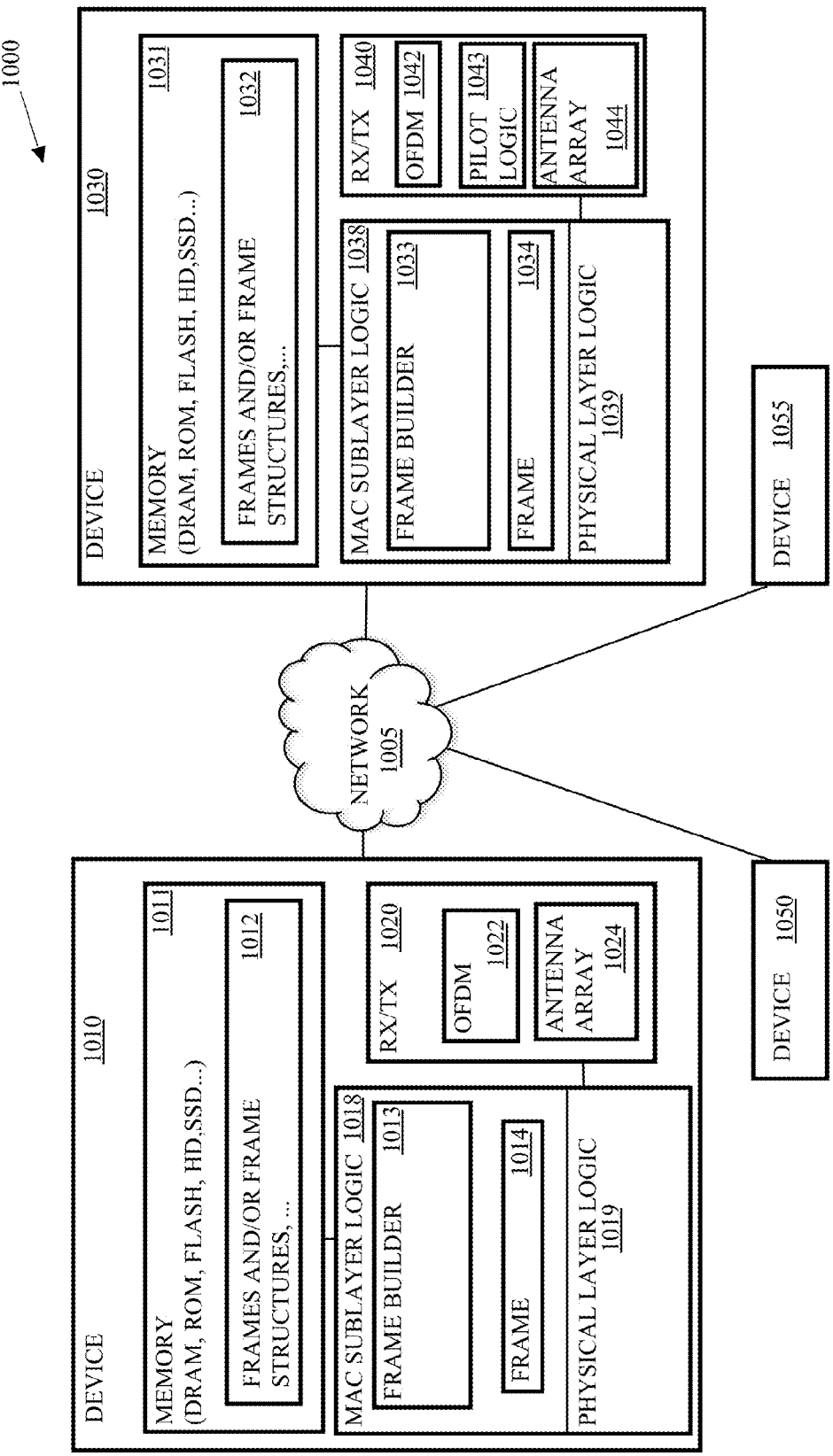
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Institute of Electrical and Electronic Engineers (IEEE) 802.11ah systems have bandwidths currently defined are 1 MHz (MegaHertz) and a set of down-clocked IEEE 802.11ac rates, namely 2, 4, 8 and 16 MHz, where the down clocking is 10×. The 1 MHz system may use a 32-point fast Fourier transform (FFT). Of those 32 carriers, 24 will be used for data and 2 for pilot. Additionally, a repetition mode is being included to extend range.

One of the issues for IEEE 802.11ah wireless networks is that with the lower data rates of the IEEE 802.11ah system, and the added use case of outdoor sensor and offloading, the Channel Doppler effect becomes significant for longer packets. For example, using the 1 MHz mode, a packet with moderate to large payload sizes can exceed tens of milliseconds. The packet times were much lower for the IEEE 802.11n/ac system, which was largely designed for indoor use, and thus the channel was assumed stationary over the entire packet. It has been shown that for modest Doppler, the IEEE 802.11ah system performance may be severely degraded without additional training, or channel updates, during the transmission of long packets.

Embodiments may use of known pilot symbol tones shifting across the bandwidth of the orthogonal frequency division multiplexing (OFDM) packet during transmission of the packet to allow receivers to track the phase correction information during the transmission of the packet. Thus, the phase correction information can be used to track channel phase with different tones.

IEEE 802.11ah devices may include, e.g., indoor and outdoor sensors and cellular offloading. Low cost devices are less likely to have stringent filtering and advanced algorithm to compensate for channel interference. The presence of reflectors in the environment surrounding a transmitter and receiver may create multiple paths that a transmitted signal can traverse. As a result, the receiver can receive a superposition of multiple copies of the transmitted signal, each traversing a different path. Each signal copy may experience differences in attenuation, delay and phase shift while travelling from the source to the receiver. This can result in either constructive or destructive interference, amplifying or attenuating the signal power seen at the receiver. The effect of destructive interference is referred to as channel fading and the fading can be detected by, e.g., variations in the signal-to-noise ratio (SNR). Strong destructive interference is frequently referred to as a deep fade and may result in temporary failure of communication due to a severe drop in the channel SNR. The channel fading may also significantly impair the ability to determine accurate phase rotations by processing stationary pilot tones.

Embodiments implement pilot logic that determines phase correction information from pilot tones. Some embodiments implement pilot logic that determines phase correction information from some of the pilot locations. In some embodiments, the pilot logic may process the shifting pilot tones for less than all of the pilot tones. In several embodiments, the logic may process pilot tones at any location within orthogonal frequency division multiplexing (OFDM) packet. In further embodiments, the logic may determine to process only pilot tones at the even or odd symbol indices or subcarriers. And, in several embodiments, the logic may transmit a packet with a frame with a capabilities information field comprising an indication that a receiver may only process shifting pilot tones for phase tracking and may not perform channel updates based upon channel state information determined by processing pilot tones.

In many embodiments, transmitters shift the location of the pilot tones every N symbols, where N may be a system parameter, setting, or a fixed value such as N=1 or N=2. Thus, the location of the pilot tones remain constant for N symbols before shifting to the next location. In several embodiments, a receiver may then use the N pilot symbols for phase tracking using an appropriate algorithm. Some embodiments described herein may implement the pilot shifting with N fixed to a value of one, which it means the pilots would shift every symbol and the implementation of a fixed value for N may also remove a need of signaling between transmitter and receiver to update the value of N because the single value used at the transmitter may be predetermined.

Various embodiments may be designed to address different technical problems associated with phase tracking with shifting pilot tones. For instance, some embodiments may be designed to address one or more technical problems such as addressing impairments to stationary pilot tones associated with channel fading for, e.g., low cost sensors that may be located indoors and have no appreciable impairment from a Doppler effect.

Different technical problems such as those discussed above may be addressed by one or more different embodiments. For instance, some embodiments that address impairments to stationary pilot tones associated with channel fading may do so by one or more different technical means such as determining phase correction information based upon shifting pilot tones, processing selected shifting pilot tones, and the like.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/get-ieee802/download/802.11-2012.pdf).

Many embodiments may be fixed, low cost sensors installed in a home or other fixed location that are not impacted by channel Doppler and operating at 1 MHz. In fact, many embodiments facilitate low cost through the improved performance, allowing some of the low cost embodiments to implement low cost front-end receiver circuitry that does not perform continual channel estimates. However, embodiments are not so limited. Several may embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

When the communications device 1010 transmits a packet to the communications device 1030 to notify the communications device 1030 that, e.g., the communications device 1010 is buffering data for the communications device 1030, the communications device 1010 may transmit an orthogonal frequency division multiplexing (OFDM) packet encapsulating a frame 1014. The OFDM 1022 of the transceiver (RX/TX) 1020 may generate the transmission with pilot tones shifting locations within the symbol indices of the transmission every N symbols. In some embodiments, the communications device 1010 may have previously transmitted an indication of the value of N to the communications device 1030. In further embodiments, the value of N may be a fixed value. In some embodiments, the value of N is fixed at a value of one.

In some of such embodiments, the communications device 1030 may communicate a capability such as a capability to process pilot tones only to track a phase of the channel by a bit in a capability information field to the communications device 1010. In several embodiments, the capability bit may refer to a single bit or a bit that is part of a pair of bits to indicate capabilities of the communications device. For instance, the pair of bits may indicate an: (a) ability to process shifted pilot tones (for channel estimate and/or phase rotation updates), (b) ability to process shifted pilot tones only for phase rotation, (c) inability to process shifted pilot tones. In other embodiments, one bit may indicate (a) ability to process shifted pilot tones (for both channel estimate and/or phase rotation updates) or (b) inability to process shifted pilot tones where the bit, if set to 1, (a) is met, if set to 0, (b) is met, or vice versa.

The communications device 1010 may transmit the OFDM packet one symbol after the other sequentially and every N symbols, the location of the pilot tones within the OFDM packet may change either sequentially or randomly. In some embodiments, the location of the pilot tones may shift by one symbol index, or, in other words, from one subcarrier to the adjacent subcarrier.

Pilot tone shifting is a process where the pilot tones are sequentially assigned to different subcarriers as a function of time. In many embodiments, only a subset of subcarriers may be used for pilot tones or data purposes (usable subcarriers). For example, the pilot tones may be used only on data subcarriers (e.g., sweep through with the pilot tone on a symbol by symbol basis), may avoid nulled subcarriers (e.g., DC subcarriers and guard subcarriers), an, in some embodiments, may even avoid data tones that are adjacent to guard or DC subcarriers, and further in some embodiments may avoid a subset of data tones, for example all even numbered tones.

Figures 1A, 1B:
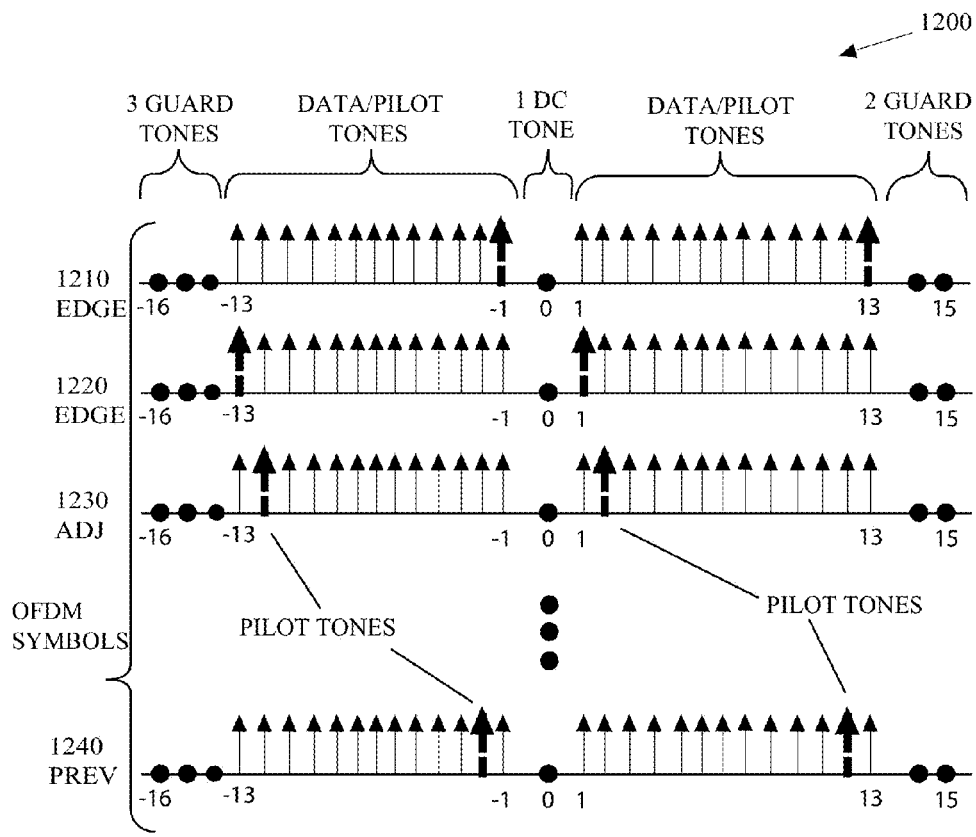
FIG. 1A depicts an embodiment of a table illustrating pilot tone locations and processing pilot tones.
FIG. 1B depicts embodiments of orthogonal frequency division multiplexing (OFDM) symbols in an OFDM packet transmission with shifting pilot tones.

The pilot tones and their positioning can be based on channel conditions such as coding scheme, packet length, and the like. FIG. 1A depicts a table 1100 of pilot tone positions demarked by symbol numbers. The following discussion is for the 1 MHz systems and is an example. There are other allocations for the 2, 4, 8 and 16 MHz bandwidths.

The table 1100 shows a progression of symbols transmitted from the communications device 1010 to the communications device 1030 from 1 to 13. The number of symbols is chosen in the present embodiment based upon the number of data and pilot tones, or useable subcarriers, and the pattern of pilot locations in relation to the symbol indices repeat after 13. In particular, the table 1100 illustrates two pilot tones for each symbol number. One pilot tone travels between the −13 subcarrier index and a −1 subcarrier index and the second pilot tone travels between the 1 subcarrier index and the 13 subcarrier index. For example, the first symbol transmitted may be symbol 1, which has two pilot tones, one located at the subcarrier index −8 and one located at the subcarrier index 6. The second symbol transmitted may then be symbol 2 with pilot tones at the subcarrier indices −9 and 5. The third symbol transmitted may then be symbol 3 with pilot tones at the subcarrier indices −10 and 4 and these pilot tone shifts continue through symbol 13 at which the pilot tones are at the subcarrier indices −7 and 7.

As shown in the table 1100, the pilot tones are shifted or assigned to different subcarriers or frequency bins as a function of time, which is referred to herein as the locations of the pilot tone. The time between shifts in the location of the pilot tones is N=1 in table 1100 so the pilot tones shift between locations between every symbol. The table 1100 also illustrates the pilot tones changing by one symbol index at a time and sequentially. However, not all embodiments may implement a location for pilot tones as a function of time that results in the pilot tones shifting through subcarriers or frequencies sequentially. In other words, the location of the pilot tones may shift every N symbols {N=1, 2, 3, 4 . . . , 8, . . . } but the shift in frequency/location may be random within the subset of subcarriers rather than sequential. The shifting of the pilot tones can also be based on the modulation and coding scheme (MCS) used for transmission or on the packet length of the transmission (i.e., channel conditions). Further, the amount of time the one or more pilot tones occupy a particular location could be based on a modulation and coding scheme (MCS) and the MCS may be selected based on a data rate and a level of robustness required by traffic type. After a set of pilot tones are assigned, the process illustrated by the table 1100 is cyclic and may be repeated over any number of symbols greater than 13.

The communications device 1030 may receive the transmission from the communications device 1010 and may utilize phase correction information determined by processing the pilot tones. In some embodiments, the pilot logic 1043 of the communications device 1030 may comprise logic to determine phase corrections to correct the residual phase error in the received OFDM symbols. In many embodiments, the pilot logic 1043 will continuously update the phase correction information with each symbol received.

In the present embodiment, the pilot logic 1043 may receive the OFDM packet with pilot tones distributed across the bandwidth of the OFDM packet in accordance with the table 1100. The table 1100 provides an example of a pattern for 1 MHz system (32 tones FFT, 24 data and 2 pilot tones in each symbol) based on which pilots travel one symbol to another covering the entire bandwidth after 13 symbols. The pattern repeats periodically to cover all symbols in a packet.

FIG. 1B illustrates an embodiment of the OFDM packet 1200 transmitted from the communications device 1010 to the communications device 1030. The OFDM module 1022 may generate different OFDM symbols for different bandwidths such a 2 MHz, 4 MHz, 8 MHz, and 16 MHz and may generate the OFDM packet 1200 for a 1 MHz bandwidth channel, for transceivers such as the transceivers of FIG. 1, corresponding to a 32-point, inverse Fourier transform. The OFDM packet 1200 comprises 32 tones on 32 subcarriers, indexed from −16 to 15. The 32 tones, in this embodiment, include 24 data tones, five guard tones, two pilot tones, and one direct current (DC) tone. The four lowest frequency tones are guard tones provided for filter ramp up and filter ramp down. The index zero frequency tone is the DC tone and is nulled, at least in part, to better enable the receivers to employ direct-conversion receivers to reduce complexity. As per a commonplace preferred practice, the DC is selected to be one of the two subcarriers closest to the middle of the frequency band. And the data and pilot frequency tones are provided between indices −13 through −1 and indices 1 through 13.

The RF receiver comprises an OFDM module 1042, which receives electromagnetic energy at an RF frequency and extracts the digital data therefrom. For 1 MHZ operation, OFDM 1042 may extract OFDM symbols comprising 24 data tones, five guard tones, and one DC tone such as the OFDM symbol 1210 illustrated in FIG. 1B. In other embodiments, the OFDM symbols may be encoded in other manners with different numbers of data tones, pilot tones, and guard tones.

Note that the OFDM packet 1200 comprises OFDM symbols 1210, 1220, 1230, through 1240 and the OFDM symbols correspond to the pilot tone pattern illustrated in table 1100. In particular, the OFDM symbols 1210-1240 illustrate a dot for each of the guard tones, which are also referred to as edge tones. There is one dot in the center of the symbols 1210-1240 illustrating the position of the DC tone as subcarrier index 0, and the DATA/PILOT TONES are demarked with numbers that start at the subcarrier index −13 on the left side through the −1 subcarrier index next to the DC tone at the 0 subcarrier index, and continue with subcarrier index 1 adjacent to the DC index 0 through the subcarrier index 13 adjacent to the guard tones on the right side.

The OFDM symbol 1220 illustrates the OFDM symbol index 6 in table 1100 and the pilot tones are the emboldened arrows at subcarrier indices {−13, 1}. Note that the OFDM symbol 1210 has pilot tones at subcarrier indices {−1, 13} adjacent to the DC tone and the guard tones. The OFDM symbol 1220 has pilot tones at subcarrier indices {−13, 1} adjacent to the DC tone and the guard tones. The OFDM symbol 1230 has pilot tones at subcarrier indices {−12, 2} adjacent to the location of the symbol index that is adjacent to the DC tone and the guard tones. And, the OFDM symbol 1230 has pilot tones at subcarrier indices {−2, 12} adjacent to the location of the subcarrier index that is adjacent to the DC tone and the guard tones.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as structures for an association request frame, an association response frame, a probe frame, and the like.

The MAC sublayer logic 1018, 1038 may comprise logic to implement functionality of the MAC sublayer of the data link layer of the communications device 1010, 1030. The MAC sublayer logic 1018, 1038 may generate the frames and the physical layer logic 1019, 1039 may generate physical layer protocol data units (PPDUs) based upon the frames. For example, the frame builder may generate frames 1014, 1034. The physical layer logic 1019, 1039 may encapsulate the frames with preambles to generate PPDUs for transmission via a physical layer device such as the transceivers represented by receive/transmit chains (RX/TX) 1020 and 1040.

The communications devices 1010, 1030, 1050, and 1055 may each comprise a transceiver (RX/TX) such as transceivers (RX/TX) 1020 and 1040. In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal subcarrier signals are used to carry data as OFDM symbols. The OFDM symbols are divided into several parallel data streams or channels, one for each subcarrier and encoded with the subcarriers by which the OFDM symbols will be transmitted to a receiving device such as twenty-four data subcarriers, five guard subcarriers, two pilot subcarriers, and one DC subcarrier. Each subcarrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols during transmission to avoid inter-symbol interference (ISI), which might result from multi-path distortion.

Each transceiver 1020, 1040 comprises an RF transmitter and an RF receiver. The RF transmitter comprises an OFDM module 1022, which impresses digital data, OFDM symbols encoded with tones, onto RF frequencies, also referred to as subcarriers, for transmission of the data by electromagnetic radiation. In the present embodiment, the OFDM module 1022 may impress the digital data as OFDM symbols encoded with tones onto the subcarriers to for transmission.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044.

Figure 1C:
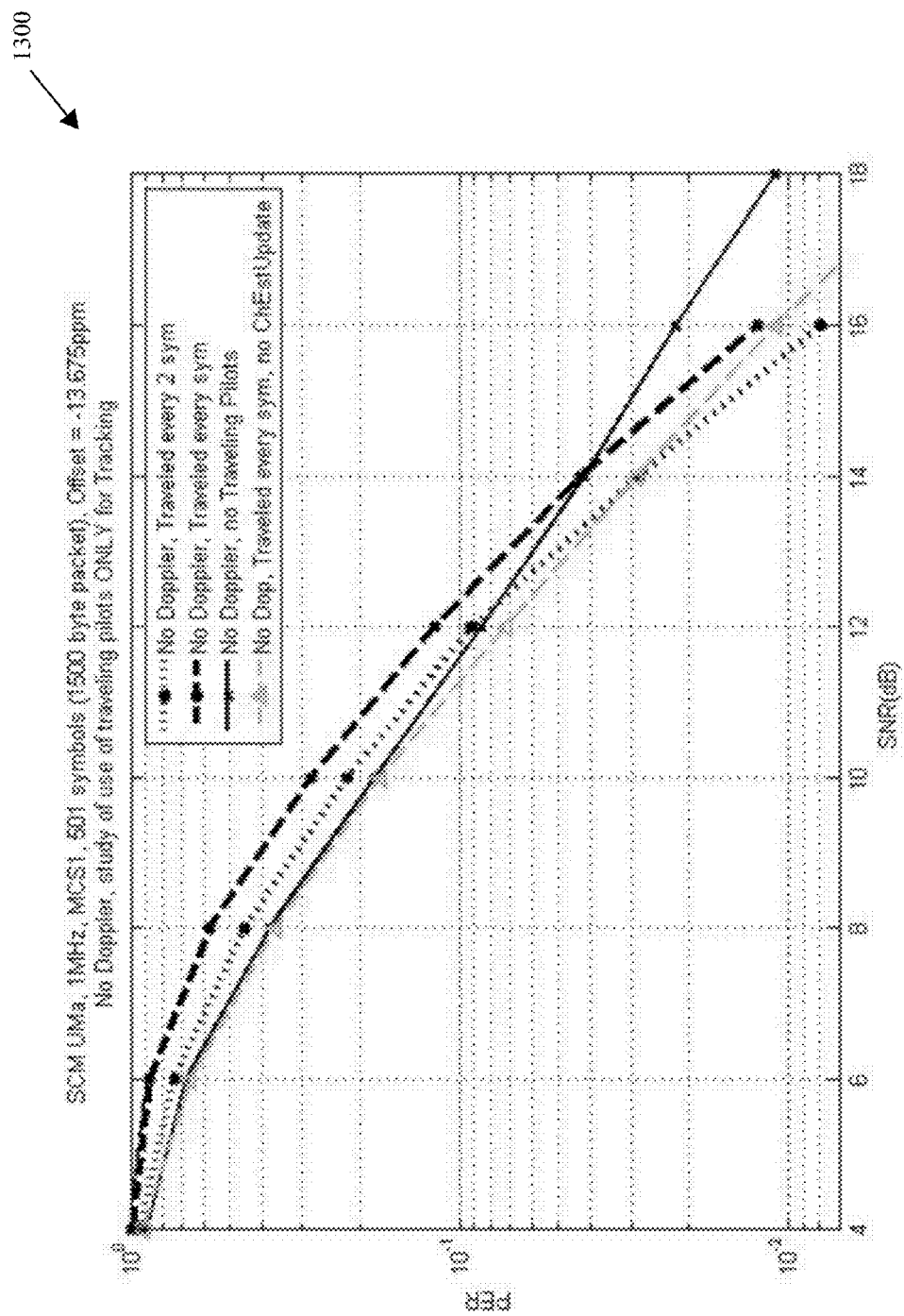
FIGS. 1C-D depicts embodiments of simulations comparing the processing of pilot tones for phase tracking only against phase tracking with channel estimate updates.
Figure 1D:
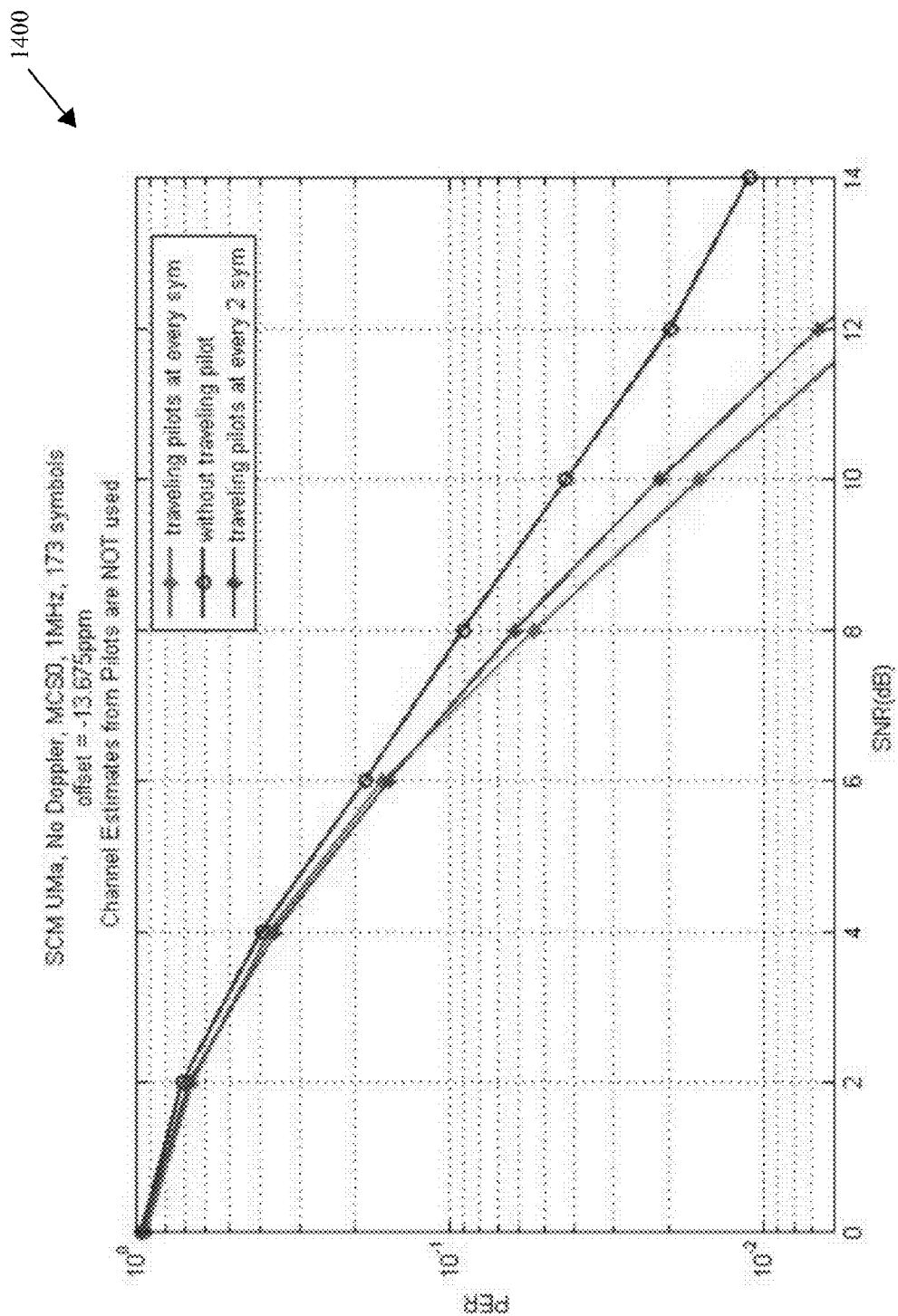
Figure 2:
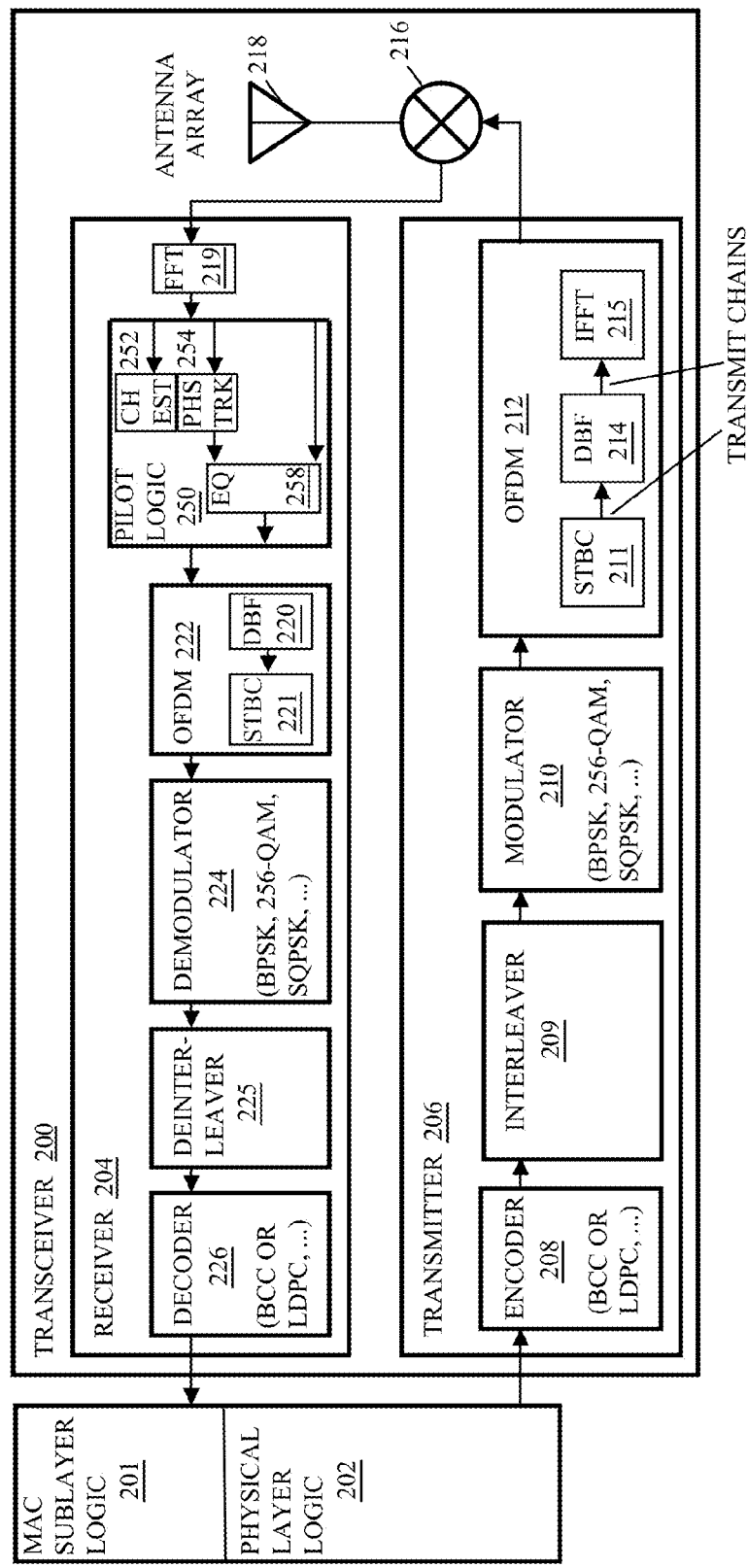
FIG. 2 depicts an embodiment of an apparatus with pilot logic to process shifting pilot tones.

FIGS. 1C-D depict embodiments of simulations 1300 and 1400 of the process implemented in the pilot logic 1043 to study the use of traveling pilots in a scenario where Doppler is not present, and show that use of shifting pilots for only phase tracking improves packet error rate (PER) performance for the full scale of signal-to-noise ratios (SNRs). In FIG. 1C, the legend indicates graphs for (1) pilots shift every 2 symbols which is N=2, (2) pilots shift every symbol which is N=1, (3) no traveling (shifting) pilots and (4) pilots shift every symbol which is N=1 and no channel estimation (meaning for phase tracking only). In FIG. 1D, the legend indicates graphs for (1) pilots shift every symbol which is N=1, (2) pilots shift every other symbol which is N=2, (3) no traveling (shifting) pilots and no channel estimation in any of the graphs in FIG. 1D (meaning for phase tracking only). These simulation cases were for modulation and coding scheme one (MCS1) (501 symbols, 1500-byte packet) in FIG. 1C and modulation and coding scheme zero (MCS0) (173 symbols, 256-byte packet) In FIG. 1D at a 1 MHz bandwidth using carrier offset of −13.675 parts per million (ppm) of an IEEE 802.11ah device. In FIG. 1C, the graph (3) curve, shows that the proposed method of using traveling pilots only for phase tracking (bypassing channel estimation) improves the performance of traditional method of no traveling pilots (solid black curve) by almost 2 dB at the 1% PER point. It also shows that the performance of the proposed method is almost as good as the cases where traveling pilots are also used to update channel estimation (note dashed and dotted black curves). FIG. 2 confirms the results for the case of a shorter packet and MCS0.

FIG. 2 depicts an embodiment of an apparatus to generate, transmit, receive, and interpret or decode frames. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200. For example, a frame builder may generate a frame including a type field that specifies whether the frame is a management, control or data frame and a subtype field to specify the function of the frame. A control frame may include a Ready-To-Send or Clear-To-Send frame. A management frame may comprise a Beacon, Probe Response, Association Response, and Reassociation Response frame type. And the data type frame is designed to transmit data.

In many embodiments, the MAC sublayer logic 201 may comprise a frame builder 202 to generate frames. The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 209 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). In some embodiments, the STBC 211 may be controlled to pass through the spatial streams for situations in which, e.g., the number of spatial streams is the maximum number of space-time streams. Further embodiments may omit the STBC.

The OFDM module 212 impresses or maps the modulated data formed as OFDM symbols onto a plurality of orthogonal subcarriers so the OFDM symbols are encoded with the subcarriers. The OFDM module 212 may generate symbols in which the pilot tones change location within the data/pilot subcarriers every N symbols. In many embodiments, the OFDM module 212 may generate symbols in which the pilot tones shift locations along the subcarrier indices sequentially. In several embodiments, the pilot tones may shift locations every symbol. For instance, when the communications device 1030 in FIG. 1 responds to a transmission from the communications device 1010, the RX/TX 1040 may respond with OFDM packets in which the pilot tones shift every N symbols. In some embodiments, the value of N may match the value of N provided by the communications device 1010. In other embodiments, the value of N may be a fixed value for the communications device 1030 and/or for the communications device 1010. In some embodiments, the communications device 1010, which may be the access point, may use a value of N provided to the communications device 1010 by the communications device 1030. And, in some embodiments, such as during association between the communications device 1030 and the communications device 1010, the communications device 1030 may transmit an indication in a capability information field in a frame of a packet to inform the communications device 1010 that the communications device 1030 only processes the shifting pilots for phase tracking and not channel updates to update the equalizer.

In some embodiments, the OFDM symbols are fed to the Digital Beam Forming (DBF) module 214. Digital beam forming techniques may be employed to increase the efficiency and capacity of a wireless system. Generally, digital beam forming uses digital signal processing algorithms that operate on the signals received by, and transmitted from, an array of antenna elements. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The OFDM module 212 may also comprise an inverse Fourier transform module that performs an inverse discrete Fourier transform (IDFT) on the OFDM symbols. In the present embodiment, the IDFT may comprise the IFFT module 215, to perform an IFFT on the data. For 1 MHz bandwidth operation, the IFFT module 215 performs a 32-point, inverse FFT on the data streams.

The output of the OFDM module 212 may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing communication signals. The communication signals may comprise, e.g., 32 tones on a 1 MHz carrier frequency with pilot tones that shift every N symbols. For example, a data collection station compliant with IEEE 802.11ah for a farm may periodically receive data from low power sensors that have integrated wireless communications devices compliant with IEEE 802.11ah. The sensors may enter a low power mode for a period of time, wake to collect data periodically, and communicate with the data collection station periodically to transmit the data collected by the sensor. In some embodiments, the sensor may proactively initiate communications with the data collection station, transmit data indicative of a communications capability, and begin communicating the data to the data collection station in response to a clear-to-send (CTS) or the like. In other embodiments, the sensor may transmit data to the data collection station in response to initiation of communications by the data collection station.

The receiver 204 may comprise a fast Fourier transform (FFT) module 219. The FFT module 219 may transform the communication signals from the time domain to the frequency domain.

The receiver 204 may comprise a pilot logic 250 comprising a channel estimator 252, a phase tracker 254, and an equalizer 258. The pilot logic 250 may be configured for processing shifting pilot tones as well as data tones. The receiver 204 may comprise an equalizer 258 with hard-coded logic or running an equalizer application or instructions, a channel estimator 252, and a phase tracker 254.

The baseband representation of the received data signals may be delivered to the input of the equalizer 258, which filters the signals in a manner dictated by the weighting function in accordance with the initial weight coefficients set the equalizer 258 based upon the long training sequence in the preamble of the OFDM transmission. The equalizer 440 may include any type of equalizer structure (including, for example, a transversal filter, a maximum likelihood sequence estimator (MLSE), and others). When properly configured, the equalizer 258 may reduce or eliminate undesirable channel effects within the received signals (e.g., inter-symbol interference).

The received data signals with pilot tones 210 are also delivered to the input of the phase tracker 254. The phase tracker 254 may implement a joint estimation algorithm for estimation of the carrier frequency offset and the timing frequency offset such as a weighted least squares (WLS) algorithm to track changes in phase over time using the pilot tones as the pilot tones are rotated through each of the OFDM subcarriers over the OFDM packet through time. As noted above, the pilot tones are separated by some number of data subcarriers so that estimation of slope and intercept for subcarrier tracking could be maintained.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated. For instance, the OFDM symbols may comprise data associated with 24 data subcarriers, two pilot subcarriers, five guard subcarriers, and one DC subcarrier.

The OFDM module 222 may comprise a DBF module 220, and an STBC module 221. The received signals are fed from the equalizer to the DBF module 220 transforms N antenna signals into L information signals. And the STBC module 221 may transform the data streams from the space-time streams to spatial streams. In one embodiment, the demodulation is performed in parallel on the output data of the FFT. In another embodiment, a separate demodulator 224 performs demodulation separately.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TX-VECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames included in the MPDU(s).

FIGS. 3A-B depict embodiments of flowcharts process pilot tones to track the phase of the channel and to generate, transmit, receive, parse, and interpret communications. Referring to FIG. 3A, the flowchart 300 may begin with receiving an OFDM packet with pilot tones that shift locations of across the bandwidth of the packet (element 302). In many embodiments, the OFDM packet may be received one symbol at a time and the pilot tones may shift to a new location every N symbols, where N may be a settable, calculated or fixed value. Thus, the pilot tones' locations may remain constant for N symbols before shifting to the next location. In some embodiments, the value of N may be fixed a 1 or 2 so the locations of the pilots shift after every symbol or after every other symbol in the transmission.

After the receiver begins to receive the OFDM packet, the receiver may begin to process the preamble of the OFDM packet to set initial weight coefficients for equalization based upon a long training sequence in the preamble of the packet (element 305). And then the receiver may begin to process pilot tones to repeatedly determine phase correction information based on pilot tones at different locations (element 310). For instance, in some embodiments, when the value of N is one, the receiver may process pilot tones with the receipt of every symbol to determine new phase correction information based upon the new location of the pilot in each symbol so the phase of the received symbols may be tracked.

The receiver may continue processing the packet with equalization based on the initial weight coefficients while continuously updating phase correction information by processing the pilot tones throughout the transmission of the packet so that the phase is continually tracked (element 310). In other words, the receiver may determine the locations that the pilot tones will shift to prior to receiving the pilot tones so the receiver may comprise logic to process those pilot tones as the pilot tones move through the various subcarriers of the OFDM packet. Updating the phase tracking based upon pilot tones in all or nearly all of the subcarriers in the OFDM transmission averages the phase variation across the subcarriers so the receiver can compensate for, e.g., carrier frequency offset, timing frequency offset, and other impairments of the data signals in the transmission.

Referring to FIG. 3B, the flowchart 350 begins with a receiver of a station such as the receiver 204 in FIG. 2 receiving a communication signal via one or more antenna(s) such as an antenna element of antenna array 218 (element 355). The communication signal may comprise the pilot tones that shift to new locations every N symbols. Thus, the pilot tone location remains constant for N symbols, then shifts to the next location. The receiver may then use the N pilot symbols for phase tracking using an appropriate algorithm.

The receiver may convert the communication signal into one or more MPDUs in accordance with the process described in the preamble (element 360). More specifically, the received signal may be fed from the one or more antennas to a pilot logic such as pilot logic 250 for equalization and phase correction and then to a DBF such as the DBF 220. The DBF transforms the signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 360) and transmits the one or more MPDUs to MAC sublayer logic such as MAC sublayer logic 202 (element 365).

The MAC sublayer logic may parse and interpret the frame in each of the MPDUs. For instance, the MAC sublayer logic may parse and interpret the frame to determine the frame type and subtype.

The following examples pertain to further embodiments. One example comprises a method. The method may involve receiving an orthogonal frequency division multiplexing (OFDM) transmission of a packet with pilot tones shifting locations between OFDM symbols; setting initial weight coefficients for equalization based upon a long training sequence in response to receiving a preamble of the packet; processing the pilot tones during the OFDM transmission to determine phase correction information based upon the pilot tones at different locations; and processing the packet with equalization based on the initial weight coefficients, wherein processing the packet comprises repeatedly updating phase tracking in response to the incoming phase correction information determined from the pilot tones.

In some embodiments, the method may further comprise transmitting a frame with a capability information field comprising an indication that the device updates phase tracking only with the pilot tones. In some embodiments, wherein receiving comprises receiving the OFDM transmission with pilot tones shifting every N OFDM symbols. In many embodiments, wherein receiving comprises receiving the OFDM transmission with pilot tones shifting every OFDM symbol. In several embodiments, wherein receiving comprises receiving the OFDM transmission via an antenna array. In several embodiments, wherein processing the pilot tones to determine phase correction information comprises determining phase rotations of the pilot tones. In several embodiments, wherein processing the pilot tones during the OFDM transmission to determine phase correction information based upon the pilot tones at different locations comprises determining the phase correction every N symbols, wherein the pilot tones shift to different locations every N symbols. And, in some embodiments, processing the pilot tones repeatedly during the OFDM transmission to determine phase correction information based upon the pilot tones at different locations comprises determining the phase correction every other symbol.

Another example comprises an apparatus. The apparatus may comprise a pilot logic to receive an orthogonal frequency division multiplexing (OFDM) transmission of a packet with pilot tones shifting locations between OFDM symbols; set initial weight coefficients for equalization based upon a long training sequence in response to receiving a preamble of the packet; process the pilot tones during the OFDM transmission to determine phase correction information based upon the pilot tones at different locations; and process the packet with equalization based on the initial weight coefficients, wherein processing the packet comprises repeatedly updating phase tracking in response to the phase correction information determined from the pilot tones; and an OFDM module coupled with the pilot logic.

In some embodiments, the apparatus may further comprise an antenna array coupled with the pilot logic to receive the orthogonal frequency division multiplexing transmission. In some embodiments, the apparatus may further comprise logic to transmit a frame with a capability information field comprising an indication that the device updates phase tracking only with the pilot tones. In some embodiments, the pilot logic comprises logic to receive the OFDM transmission with pilot tones shifting every N OFDM symbols. In some embodiments, the pilot logic comprises logic to receive the OFDM transmission with pilot tones shifting every OFDM symbol. In some embodiments, the pilot logic comprises logic to process the pilot tones, comprises logic to determine phase rotations of the pilot tones. In some embodiments, the pilot logic comprises logic to process the pilot tones comprises logic to determine the phase correction every N symbols, wherein the pilot tones shift to different locations every N symbols. And, in some embodiments, the pilot logic comprises logic to process the pilot tones comprises logic to determine the phase correction every other symbol.

Another example comprises a system. The system may comprise a receiver to receive an orthogonal frequency division multiplexing (OFDM) transmission of a packet with pilot tones shifting locations between OFDM symbols; set initial weight coefficients for equalization based upon a long training sequence in response to receiving a preamble of the packet; process the pilot tones during the OFDM transmission to determine phase correction information based upon the pilot tones at different locations; and process the packet with equalization based on the initial weight coefficients, wherein processing the packet comprises repeatedly updating phase tracking in response to the phase correction information determined from the pilot tones; and a transmitter to transmit a second OFDM transmission with pilot tones shifting locations.

In some embodiments, the system may further comprise an antenna array coupled with the receiver to receive the OFDM transmission and the transmitter to transmit the second OFDM transmission. In some embodiments, logic to transmit a frame with a capability information field comprising an indication that the device updates phase tracking only with the pilot tones. In some embodiments, the receiver comprises logic to receive the OFDM transmission with pilot tones shifting every N OFDM symbols. In some embodiments, the receiver comprises logic to receive the OFDM transmission with pilot tones shifting every OFDM symbol. In some embodiments, the receiver comprises logic to process the pilot tones comprises logic to determine phase rotations of the pilot tones. In some embodiments, the receiver comprises logic to process the pilot tones comprises logic to determine the phase correction every N symbols, wherein the pilot tones shift to different locations every N symbols. And, in some embodiments, the receiver comprises logic to process the pilot tones comprises logic to determine the phase correction every other symbol.

The following examples pertain to further embodiments. One example comprises a machine-accessible product. The machine-accessible product may comprise a medium containing instructions for phase tracking with shifting pilot tones, wherein the instructions, when executed by the access point, causes the access point to perform operations, the operations comprising: receiving an orthogonal frequency division multiplexing (OFDM) transmission of a packet with pilot tones shifting locations between OFDM symbols; setting initial weight coefficients for equalization based upon a long training sequence in response to receiving a preamble of the packet; processing the pilot tones during the OFDM transmission to determine phase correction information based upon the pilot tones at different locations; and processing the packet with equalization based on the initial weight coefficients, wherein processing the packet comprises repeatedly updating phase tracking in response to the phase correction information determined from the pilot tones.

In some embodiments, the operations may further comprise transmitting a frame with a capability information field comprising an indication that the device updates phase tracking only with the pilot tones. In some embodiments, receiving comprises receiving the OFDM transmission with pilot tones shifting every OFDM symbol. In many embodiments, processing the pilot tones to determine phase correction information comprises determining phase rotations of the pilot tones. In several embodiments, processing the pilot tones repeatedly during the OFDM transmission to determine phase correction information based upon the pilot tones at different locations comprises determining the phase correction every N symbols, wherein the pilot tones shift to different locations every N symbols. And, in some embodiments, wherein processing the pilot tones repeatedly during the OFDM transmission to determine phase correction information based upon the pilot tones at different locations comprises determining the phase correction every other symbol.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method to phase track with shifting pilot tones, the method comprising:

receiving an orthogonal frequency division multiplexing (OFDM) transmission of a packet with a preamble and data, wherein pilot tones shift locations in the data between OFDM symbols of the packet;

processing the pilot tones in the data to determine phase correction information based upon the pilot tones in the data during the OFDM transmission from more than one of the OFDM symbols;

updating phase tracking in response to the phase correction information; and not performing channel updates based upon channel state information from the pilot tones in the data in the more than one OFDM symbols.

2. The method of claim 1, further comprising transmitting a frame with a capability information field comprising an indication that a receiver updates phase tracking with the pilot tones that shift locations between OFDM symbols.

3. The method of claim 1, wherein receiving comprises receiving the OFDM transmission with pilot tones shifting every N OFDM symbols.

4. The method of claim 1, wherein receiving comprises receiving the OFDM transmission with pilot tones shifting every OFDM symbol.

5. The method of claim 1, wherein receiving comprises receiving the OFDM transmission via an antenna array.

6. The method of claim 1, wherein processing the pilot tones in the data to determine phase correction information comprises determining phase rotations of the pilot tones.

7. The method of claim 1, wherein processing the pilot tones to determine phase correction information comprises determining the phase correction every N symbols, wherein the pilot tones shift to different locations every N symbols.

8. The method of claim 1, wherein processing the pilot tones in the data to determine phase correction information comprises determining the phase correction every other symbol.

9. A device to phase track with shifting pilot tones, the device comprising:
   circuitry comprising:
      logic to receive an orthogonal frequency division multiplexing (OFDM) transmission of a packet with a preamble and data, wherein pilot tones shift locations in the data between OFDM symbols of the packet;
      logic to process the pilot tones in the data to determine phase correction information based upon the pilot tones in the data during the OFDM transmission from more than one of the OFDM symbols; and
      logic to update phase tracking in response to the phase correction information and not perform channel updates based upon channel state information from the pilot tones in the data in the more than one OFDM symbols.

10. The device of claim 9, further comprising an antenna array coupled with the circuitry to receive the orthogonal frequency division multiplexing transmission.

11. The device of claim 9, further comprising logic to transmit a frame with a capability information field comprising an indication that the device updates phase tracking with the pilot tones that shift locations between OFDM symbols.

12. The device of claim 9, wherein the circuitry comprises logic to receive the OFDM transmission with pilot tones shifting every N OFDM symbols.

13. The device of claim 9, wherein the circuitry comprises logic to receive the OFDM transmission with pilot tones shifting every OFDM symbol.

14. The device of claim 9, wherein the logic to process the pilot tones comprises logic to determine phase rotations of the pilot tones.

15. The device of claim 9, wherein the logic to process the pilot tones comprises logic to determine the phase correction every N symbols, wherein the pilot tones shift to different locations every N symbols.

16. The device of claim 9, wherein the logic to process the pilot tones comprises logic to determine the phase correction every other symbol.

17. A system to phase track with shifting pilot tones, the system comprising:
   a processor, a radio, and one or more antennas;
   a receiver coupled with the radio to receive an orthogonal frequency division multiplexing (OFDM) transmission of a packet with a preamble and data, wherein pilot tones shift locations in the data between OFDM symbols of the packet; process the pilot tones in the data to determine phase correction information based upon the pilot tones in the data during the OFDM transmission from more than one of the OFDM symbols; update phase tracking in response to the phase correction information; and not perform channel updates based upon channel state information from the pilot tones in the data in the more than one OFDM symbols; and
   a transmitter coupled with the radio to transmit a second OFDM transmission with pilot tones shifting locations.

18. The system of claim 17, further comprising logic to transmit a frame with a capability information field comprising an indication that the receiver updates phase tracking with the pilot tones that shift locations between OFDM symbols.

19. The system of claim 17, wherein the one or more antennas comprise an antenna array coupled with the receiver to receive the OFDM transmission and the transmitter to transmit the second OFDM transmission.

20. The system of claim 17, wherein the receiver comprises logic to receive the OFDM transmission with pilot tones shifting every N OFDM symbols.

21. The system of claim 17, wherein the receiver comprises logic to receive the OFDM transmission with pilot tones shifting every OFDM symbol.

22. The system of claim 17, wherein the logic to process the pilot tones comprises logic to determine phase rotations of the pilot tones.

23. The system of claim 17, wherein the logic to process the pilot tones comprises logic to determine the phase correction every N symbols, wherein the pilot tones shift to different locations every N symbols.

24. The system of claim 17, wherein the logic to process the pilot tones comprises logic to determine the phase correction every other symbol.

25. A machine-accessible product comprising:
   a non-transitory medium containing instructions to phase track with shifting pilot tones, wherein the instructions, when executed by a device, causes the device to perform operations, the operations comprising:
   receiving an orthogonal frequency division multiplexing (OFDM) transmission of a packet with a preamble and data, wherein pilot tones shift locations in the data between OFDM symbols of the packet;
   processing the pilot tones in the data to determine phase correction information based upon the pilot tones in the data during the OFDM transmission from more than one of the OFDM symbols;
   updating phase tracking in response to the phase correction information; and
   not performing channel updates based upon channel state information from the pilot tones in the data in the more than one OFDM symbols.

26. The machine accessible product of claim 25, wherein the operations further comprise transmitting a frame with a capability information field comprising an indication that a receiver updates phase tracking with the pilot tones that shift locations between OFDM symbols.

27. The machine accessible product of claim 25, wherein receiving comprises receiving the OFDM transmission with pilot tones shifting every OFDM symbol.

28. The machine accessible product of claim 25, wherein processing the pilot tones to determine phase correction information comprises determining phase rotations of the pilot tones.

29. The machine accessible product of claim 25, wherein processing the pilot tones to determine phase correction information comprises determining the phase correction every N symbols, wherein the pilot tones shift to different locations every N symbols.

30. The machine accessible product of claim 25, wherein processing the pilot tones to determine phase correction information comprises determining the phase correction every other symbol.

* * * * *